United States Patent [19]

Rees

[11] Patent Number: 4,478,617
[45] Date of Patent: Oct. 23, 1984

[54] STRAINER ARRANGEMENT FOR COMBINED DIRT COLLECTOR AND CUT OUT COCKS

[75] Inventor: James G. Rees, Chicago, Ill.

[73] Assignee: William R. Page, Bristol, Wis.; a part interest

[21] Appl. No.: 429,277

[22] Filed: Sep. 30, 1982

[51] Int. Cl.³ .................... B01D 50/00; F16D 65/00
[52] U.S. Cl. ..................................... 55/314; 55/323;
55/337; 55/482; 55/489; 55/502; 55/507;
188/218 A; 137/545; 137/549
[58] Field of Search ................. 55/313, 314, 323, 337,
55/429, 482, 488, 489, 502, 505, 507, 523, 525,
528; 210/130, 304, 315, 418, 420, 444, 338;
137/545, 546, 549, 550; 188/218 A

[56] References Cited

U.S. PATENT DOCUMENTS

| | | | |
|---|---|---|---|
| 1,107,485 | 8/1914 | Bowser | 210/304 |
| 2,057,219 | 10/1936 | Vokes | 210/315 |
| 2,157,554 | 5/1939 | McFarlin | 137/549 |
| 2,170,074 | 8/1939 | Hewitt | 55/313 |
| 2,734,636 | 2/1956 | Foster | 210/130 |
| 2,876,793 | 3/1959 | Vanderpoel et al. | 137/550 |
| 3,402,529 | 9/1968 | Frantz | 210/304 |
| 3,918,942 | 11/1975 | Rechtsteiner et al. | 55/505 |
| 4,100,323 | 7/1978 | Forsten | 55/528 |
| 4,276,589 | 5/1981 | Dykzeul | 137/550 |
| 4,278,544 | 7/1981 | Takashima | 55/523 |

FOREIGN PATENT DOCUMENTS 2201916  5/1974  France ........................ 55/482

Primary Examiner—David L. Lacey
Attorney, Agent, or Firm—McWilliams, Mann, Zummer and Sweeney

[57] ABSTRACT

A strainer device for railroad car air brake combined dirt collector and cut out cocks, and arranged to be applied within the swirl chamber of such cocks, and between the collector bowl, about the pedestal thereof, and the lip of the cock throat chamber, which strainer device comprises an outer shell that is open and flanged at both ends, with one end of the outer shell being disposed adjacent the throat lip, an annular seal applied between the said outer shell one end and the throat lip, an inner shell disposed within the outer shell and secured at the other end of the outer shell and adapted to receive the cock collector chamber pedestal, and a compression spring received about the pedestal within the cock collector bowl and resiliently seated against the outer shell end flange at that end of same for spring biasing the other end of the outer shell and the seal against the throat lip. The outer shell is formed from a foraminous material defining mesh openings that in total area exceed the area of the cock throat by a factor of at least thirteen, for accommodating possible extensive foreign material occlusion of the mesh openings free of reduction of air flow capacity through the combined dirt collector and cut out cock. The inner sleeve is optionally provided with a check valve arrangement to provide a stand-by path for air needed to charge and release the brakes in the event that the strainer itself becomes so occluded that it could not pass air through its mesh openings.

10 Claims, 11 Drawing Figures

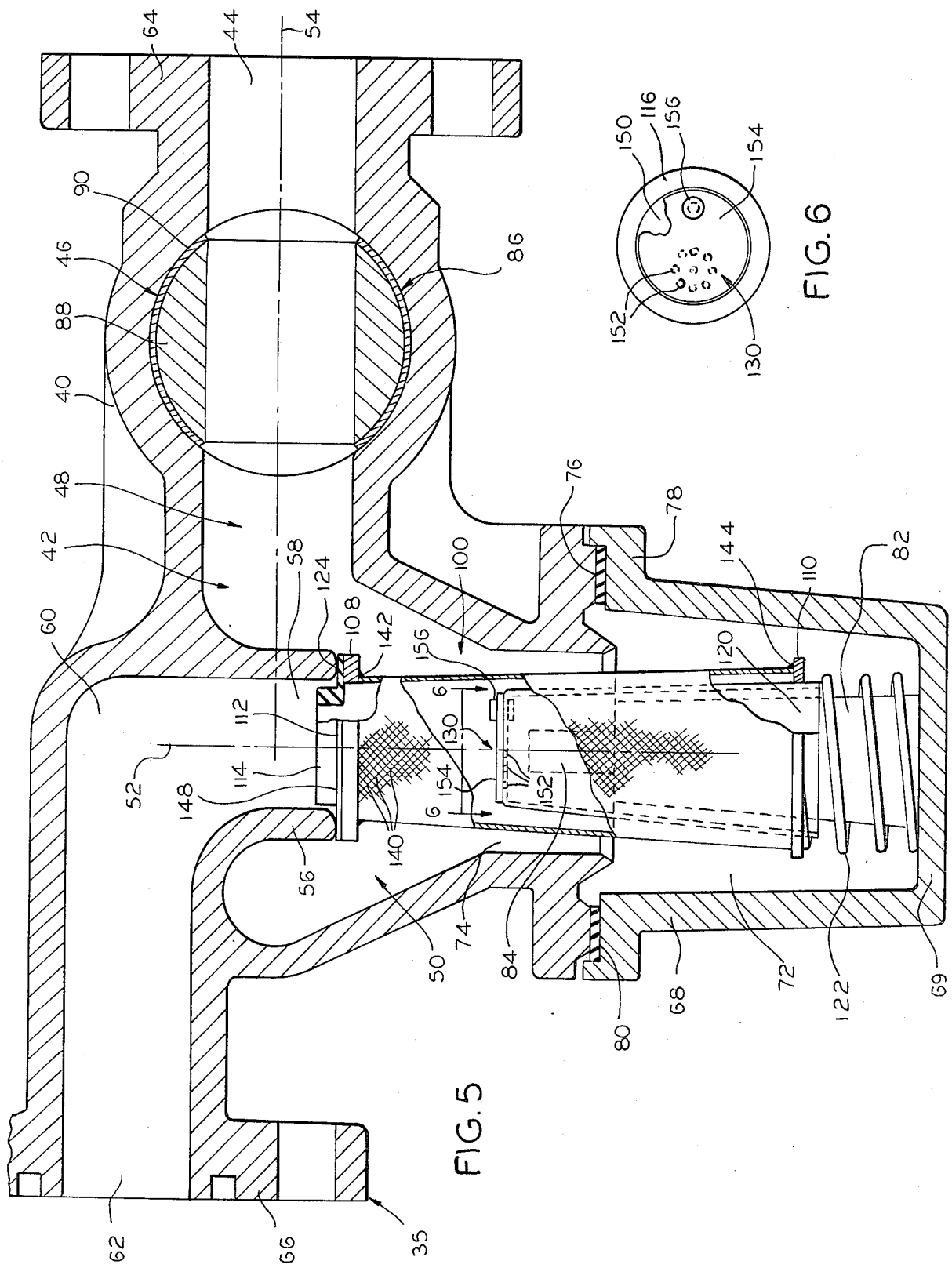

STRAINER ARRANGEMENT FOR COMBINED DIRT COLLECTOR AND CUT OUT COCKS

This invention relates to a strainer arrangement or device for the conventional combined dirt collector and cut out cock that is commonly employed in railroad car air brake equipment, and more specifically, the invention is concerned with the specifics of a strainer arrangement or device that is specifically adapted to be interposed in the swirl chamber of such cocks, to protect the car air brake control valve from foreign matter, and yet insure adequate air passage through the cock even though occlusion of the strainer device may be at a high level due to undesirable foreign materials that may have entered into the air brake conduiting involved.

Conventionally, air operated brakes of a railroad car are operated by one or more brake cylinders that are supplied by a single pipe, known as a brake pipe, which is normally charged to a predetermined pressure level, from the locomotive of the train of which the car is a part, with the brake pipes of each car being connected together, in the usual end to end relation, by the familiar releasable hose connectors. As to each car, the supply of air provided through the brake pipe passes through the branch pipe into the car air brake control valve, which typically may be of the common AB, ABD, ABDW, or Z1AW valve types, with a suitable volume of air being stored in each car in reservoirs known as "auxiliary" and "emergency" reservoirs. The 1980 Edition of the Car & Locomotive Cyclopedia illustrates typical installations of such equipment at pages 554 through 560, for instance (the disclosures of which are hereby incorporated herein by this reference).

It has long been common practice in connection with the arrangement of railroad car air brake equipment of this type to include in the branch pipe (which is the air supply line between the brake pipe and the control valve) a combination dirt collector and shut off valve commonly known as the "combined dirt-collector and cut out cock" (CDC). CDC devices are provided to alleviate the foreign matter problems presented by foreign matter that may enter into the disconnected end hose connectors when the cars stand idle on sidings and are disconnected from trains. In addition, at the time of construction of the car, foreign matter commonly enters into the brake pipe and other air conduit components.

In any event, the common CDC device is in the form of a body, in the form of casting, providing a through passage through same that is controlled at the brake pipe end of the CDC through a suitable off-on valve that is commonly known as the isolation valve, with the CDC through passage also including a swirl chamber below an annular lip that defines a throat portion of the CDC through which the air is to pass after undergoing a reversal of direction in the swirl chamber, with the foreign matter being expected to fall downward past a coventional check valve arrangement into the CDC collection chamber in which it drops into a removable bowl (see for instance, page 560 of the 1980 Car & Locomotive Cyclopedia citation).

The basic idea behind the arrangement of the conventional CDC is that in normal service usage of the air brake system involved, there is to be insufficient turbulence created in the collection chamber to re-entrain foreign matter particles for unwanted conveyance into the control valve; in the case of emergency brake applications where greater turbulence than normal could be created, the pressure differentials involved between the brake pipe end of the CDC and its swirl chamber act to cause the conventional check valve to act as such and keep the foreign material particles trapped in the CDC collection chamber.

Should foreign material obtain access into the control valve and impair its operation, the isolation valve is operated to shut off the control valve to isolate that particular car in the train, without affecting the brake pipe pressure for other cars of the train.

Experience has shown that the common CDC is not particularly effective in trapping lighter or less dense foreign material particles that somehow get into the brake pipe, although heavier pieces generally are effectively removed. The foreign matter involved may be organic or inorganic in composition, and may take the form of dirt, debris, cinders, grit, metal pieces and particles, corn, grain, wood chips, and the like, and the great bulk of it is of rather small particulate configuration, which due to the air fluid flows involved to the control valve in the operation of the car air brakes, all too frequently readily passes through the CDC to foul the brake control valve.

A principal object of the present invention is to provide a strainer device for application to conventional CDC devices in place of the conventional check valve that, when in place, provides effective protection for the control valve against the foreign material or matter fouling problem, without otherwise requiring modification of the CDC device and insuring that no side effect malfunctions are caused by operation of the strainer device.

Another principal object of the invention is to provide a strainer device for CDC devices which may be conveniently applied between the CDC throat defining lip or flange and the collector bowl, and about the bowl pedestal, for ready application of the device to existing as well as new CDC's.

Yet another principal object of the invention is to provide a strainer arrangement for CDC devices that involves a mesh arrangement in which the mesh openings of the strainer in total area exceed the area of the cock throat by a factor of at least ten whereby extensive foreign matter occlusion of the mesh openings may be accommodated without adversely affecting the air flow capacity through the so equipped CDC.

Yet another object of the invention is to provide a strainer arrangement for CDC devices that is economical of manufacture, convenient to apply, and efficient and long lived in operation.

In accordance with the invention, a strainer device is provided for application in the CDC device, between the floor of the collector bowl and the lip or flange that defines the cock throat, which strainer device comprises an outer, open ended shell formed from a foraminous material and that is flanged at both ends, with one end of the outer shell being equipped with an annular seal for application against the throat defining lip. The strainer device further comprises a shorter, open ended inner shell disposed within the outer shell and having one end thereof secured to the outer shell at the other end of the latter, which inner shell is adapted to be received over the conventional collector bowl pedestal. A helical compression spring is received about the pedestal and interposed between the collector bowl floor and the outer shell lower end flange to resiliently seat the strainer seal against the CDC throat defining lip or flange. The foraminous material forming the outer shell defines mesh openings that in total area exceed the area of the cock throat by a factor of at least ten and preferably at least thirteen, and the outer shell in length and breadth proportioning, minimizes the mesh surfacing of the strainer. The inner shell extends short of the outer shell upper end and is equipped to provide a stand by path for air needed to charge and release the brakes in the event that the outer shell becomes totally occluded by foreign material.

Other objects, uses and advantages will be obvious or become apparent from a consideration of the following detailed description and the application drawings in which like reference numerals indicate like parts throughout the several views.

In the drawings:

FIG. 5 is a vertical sectional view through the CDC, taken substantially along line 5—5 of FIG. 3, and illustrating the strainer device arrangement of the present invention as applied to same, and showing the embodiment of FIG. 2;

FIG. 6 is a top plan view of the inner shell of the strainer device, illustrating details of construction;

However, it is to be distinctly understood that the specific drawing illustrations provided are supplied primarily to comply with the requirements of the Patent Laws, and that the invention is susceptible of other embodiments that will be obvious to those skilled in the art, and which are intended to be covered by the appended claims.

GENERAL DESCRIPTION

Figure 1:
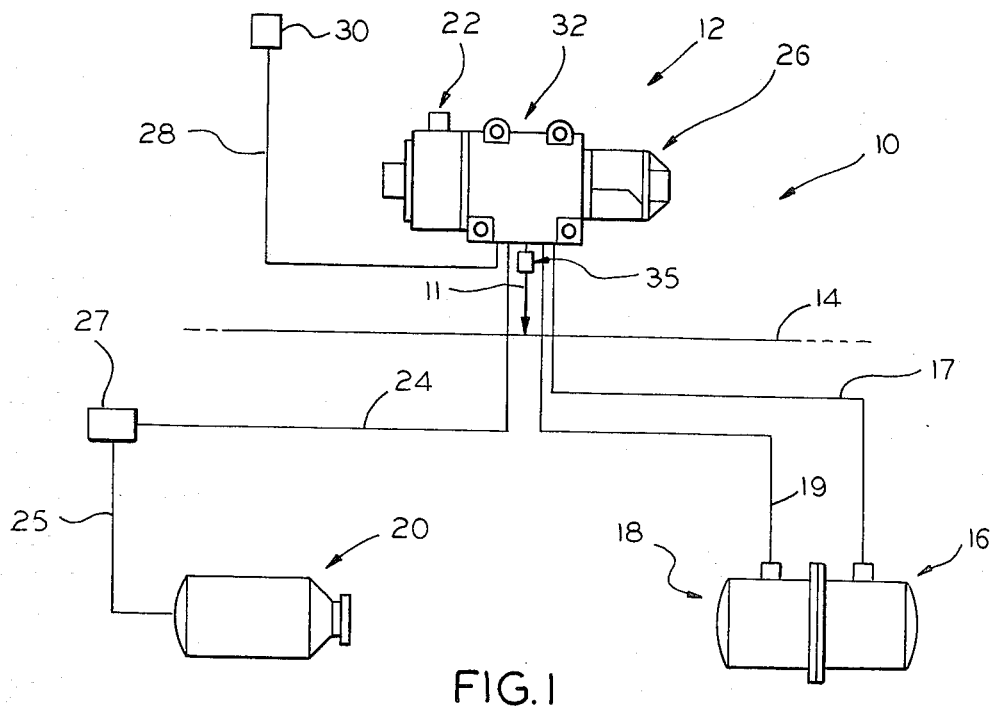
FIG. 1 is a diagrammatic view in largely block diagram form indicating the principal air operated components of a typical railroad freight vehicle, indicating also in block diagram form the location of a typical CDC to which the invention is applicable.

Reference numeral 10 of FIG. 1 generally indicates the principal air operated and air operating components of a typical railroad freight car air operated brake apparatus including the usual AB control valve 12 (which may also take the form of the well known ABD, ABDW, or Z1AW valves) to which is connected, by branch pipe 11, the familiar brake pipe 14; also shown diagrammatically are the familiar and usual auxiliary reservoir 16, emergency reservoir 18, and brake cylinder 20. As usual, the control valve 12 includes service portion 22 adapted to operate both a service and an emergency rate of reduction in pressure of the fluid (air) in the car brake pipe 14 for supplying fluid under pressure from the auxiliary reservoir 16 to the brake cylinder 20 through conduiting 24 and brake pipe 25 (the latter conduiting including suitable empty and load control equipment 27, as desired (several forms of which are illustrated in the referred to Car & Locomotive Cyclopedia citation, at page 559). Control valve 12 also includes emergency portion 26 adapted to operate only upon an emergency rate of reduction of pressure of the air in the brake pipe 14 for supplying air under pressure from emergency reservoir 18 to brake cylinder 20.

Upon recharging of the brake pipe 14 on release of the brakes, control valve 12 operates in a conventional manner to open the brake cylinder 20 and pipes 24 and 25 to atmosphere, through pipe 28 and retaining valve device 30. At the same time, the recharging of the brake pipe 14 effects the recharging of the reservoirs 16 and 18 in the usual and well known manner. The service and emergency portions 22 and 26 of the control valve 12 are mounted on the opposite faces of the conventional pipe bracket 32 to which all pipe connections to the brake control valve 12 are made, as is conventional, and as indicated by the showing of FIG. 1.

As is also conventional, branch pipe 11 has incorporated in same the aforementioned conventional combined dirt collector and cut out cock device 35, which is applied thereto, for instance, as suggested by the aforereferred to 1980 Edition Car & Locomotive Cyclopedia citation (see, for instance, page 554 of same), with the nature of the CDC device involved being diagrammatically illustrated at page 560 of the same authority.

Figure 3:
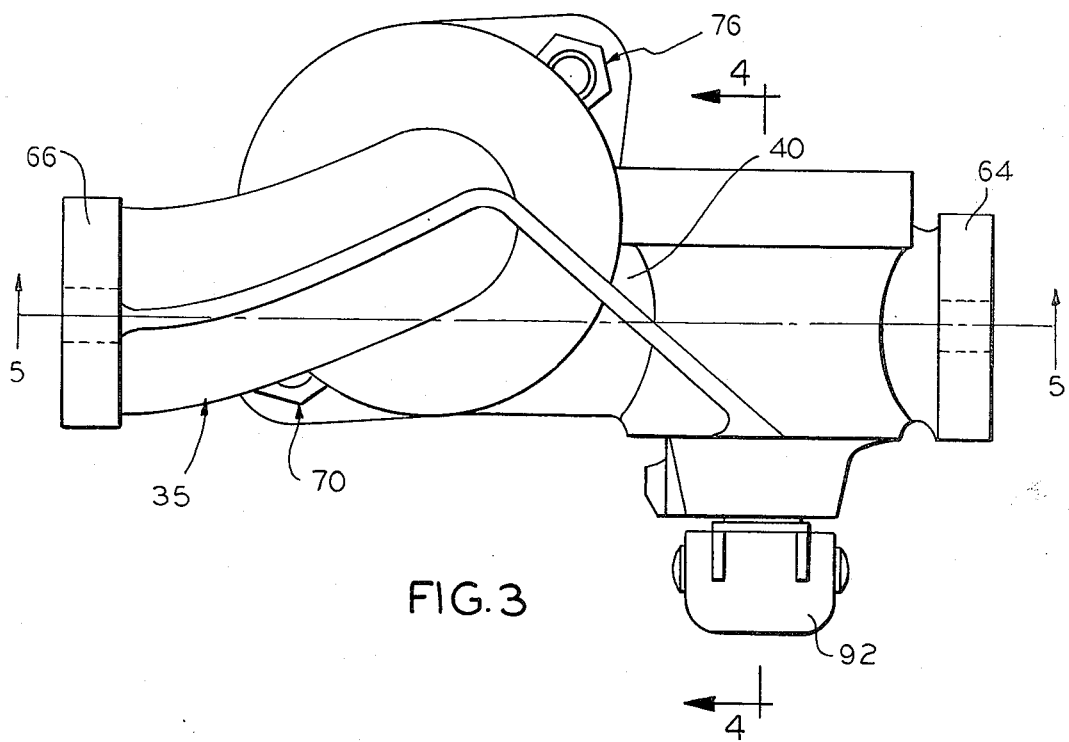
FIG. 3 is a top plan view of a conventional CDC device equipped with the present invention.
Figure 4:
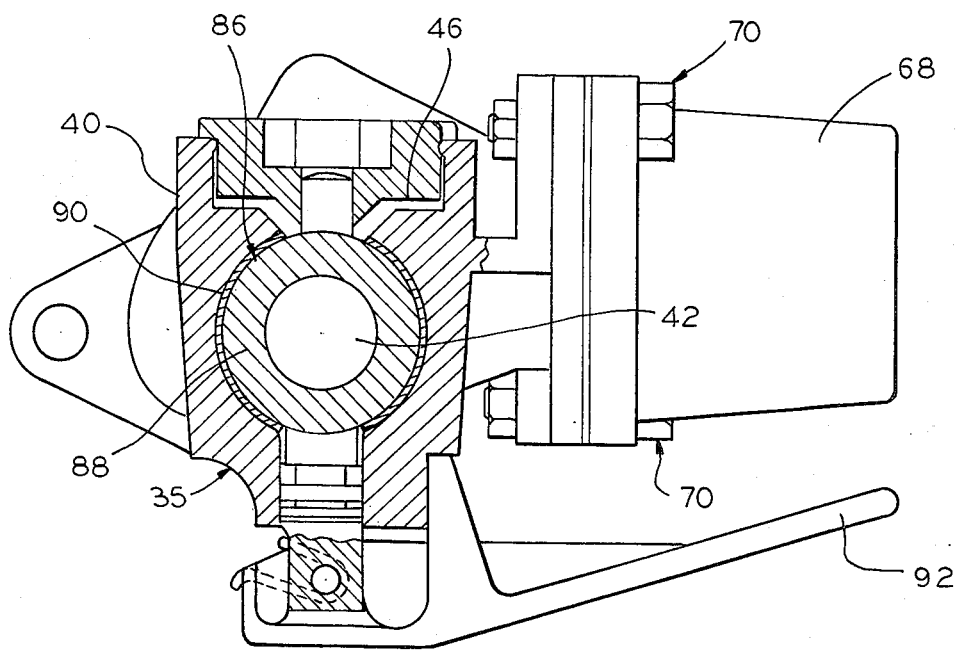
FIG. 4 is a vertical sectional view taken substantially along line 4—4 of FIG. 3, better illustrating, but diagrammatically, the isolation valve of same.

The basic structural arrangement of the CDC device per se is well known in the art, and in practice conforms substantially to the general arrangement shown at page 560 of the aforementioned Car & Locomotive Cyclopedia authority. FIGS. 3-5, for completeness of disclosure diagrammatically illustrate the specifics involved, from which it will be seen that the conventional CDC device 35 comprises body 40 that conventionally is in the form of a suitable casting or the like and is shaped to define through passage 42 (see FIG. 5), that includes inlet 44, valve chamber 46, axial air flow chamber 48, which is in free and open communication with swirl chamber 50 that is formed to be generally coincident about an axis 52 that extends normally of or perpendicular to axis 54 along which inlet 44, valve chamber 46, and air flow chamber 48 lie. The body 40 in the portion of same that defines the swirl chamber 50 includes annular flange or lip 56 which forms throat 58 into which air emerging from swirl chamber 50, after having imposed on same the reversal of direction that is contemplated by the CDC device, passes into throat chamber 60 and thence through outlet 62 to and into the control valve 12, on for instance, release of the brakes.

The body 40 is conventionally flanged as at 64 at its inlet end for incorporation by coupling into the branch line 11, and is also flanged as at 66 at its outlet end for similar appropriate connection to the control valve 12 or conduiting leading to same, as the case may be. Conventionally appropriate screw type fasteners are applied to the flanges 64 and 66 and the parts they are connected to for this purpose.

The body 40 conventionally has associated with same dirt collector bowl 68, which is suitably secured to the body 40, as by employing suitable screw type fastening devices 70 (see FIGS. 3 and 4), and in substantial coincidence with the axis 52, to define collector chamber 72 with which swirl chamber 50 communicates by way of discharge opening 74 that is centered on swirl chamber 50 and collector chamber 72. Suitable seal 76 is clamped between the bowl rim 78 and the body annular seal seat 80 to seal off the chamber 72 from the atmosphere when the bowl 68 is properly assembled to body 40.

The bowl 68 includes conventional pedestal 82 that in the assembled relation of the CDC is aligned with the axis 52 and at its upper end suitably mounts the familiar check valve (not shown) that conventionally forms a part of CDC devices, as is illustrated in the cited Car & Locomotive Cyclopaedia authority at page 560.

The valve chamber 46 has operably mounted in same suitable valve device 86, comprising appropriate valve member 88 cooperating with suitable seal device 90, for optionally shutting off air flow through the CDC through passage 42. Valve member is actuated by suitable actuation handle 92 oriented so that the valve 86 is open (the position of FIG. 5) when the handle is crosswise to the branch pipe 11 (see FIGS. 3 and 4), and is closed when the handle 92 is positioned to be parallel to same.

When air is supplied to the control valve 12 through normal operation of the air brake equipment involved, and valve device 86 is open, the air enters the body 40 at port 44 and traverses the through passage 42; foreign matter, such as the particulate matter aforementioned, which has entered the brake pipe 14 and finds its way into the branch pipe 11, is moved by the incoming air through valve device 86 and into the swirl chamber 50, where the air flow undergoes a reversal of direction to enter the throat 58, throat chamber 60 and pass therefrom to the control valve 12. The foreign particulate matter involved is expected to drop under gravity past the conventional check valve (not shown) applied to the top of pedestal 82 and fall into collector chamber 72 whereby such particulate matter is trapped therein to accumulate for periodic removal on scheduled periodic removal and cleaning of the bowl 68.

However, as indicated, it is well known that the foreign material removal effected from the air flow through the CDC device 35, in the conventional form shown in the cited Car & Locomotive Cyclopaedia publication (page 560) is frequently ineffective, particularly with regard to light weight and/or small size foreign materials, resulting in the admission of foreign materials into the brake control valve 12 and the consequent failure of operation of same, which necessitates the aforementioned closing of isolation valve device 86.

In accordance with the present invention, the CDC device 35 is provided with elongate strainer device 100 (FIGS. 2 and 5) or 100A (FIG. 7) that replaces the aforementioned conventional check valve, and that is interposed in the swirl chamber 50 in seal tight relation with the body flange or lip 56, and in overlying relation with the bowl pedestal 82, and extending well down into the collection chamber 72.

Figure 2:
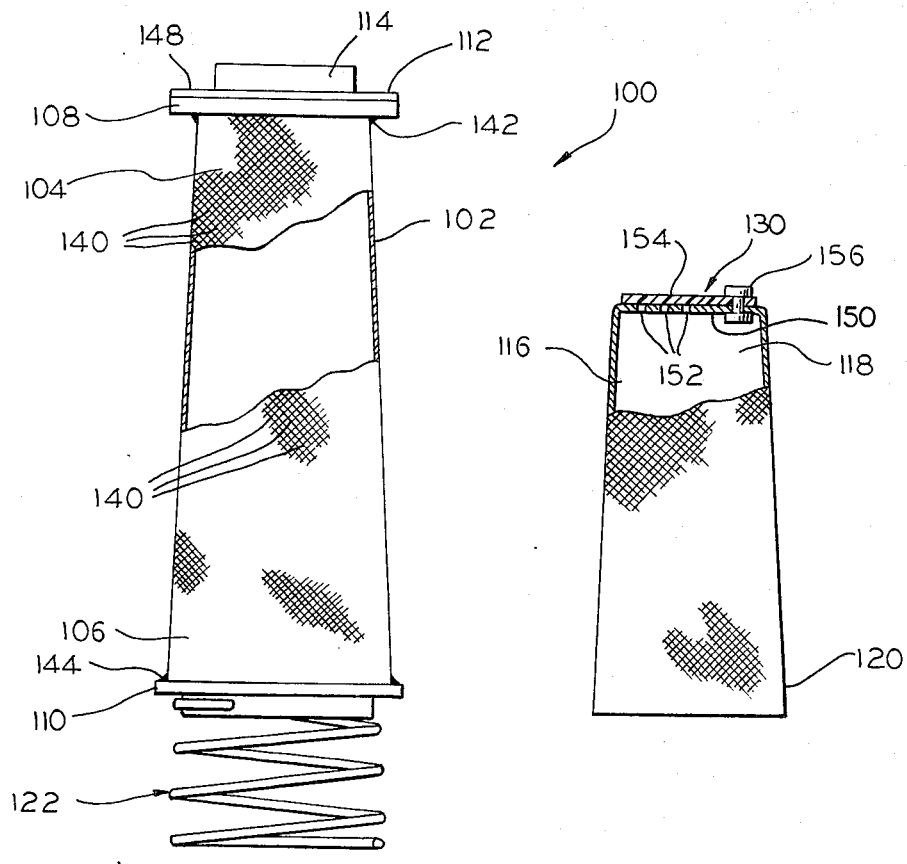
FIG. 2 is a plan view of the basic components of one strainer device embodiment in accordance with the invention.

Referring to, for instance, FIG. 2, it will be seen that the basic components of the strainer device 100 comprise open ended outer shell 102 that is provided at its respective ends 104 and 106 with the respective annular end flanges 108 and 110 that are suitably affixed thereto. The end flange 108 cooperates with annular seal 112 that is formed to define centering annular flange or collar 114 that is in concentric relation with seal 112.

The device 100 also comprises shorter inner shell 116 defining ends 118 and 120, with it being contemplated that the inner shell 116 is to be disposed within the outer shell 102 in the manner diagrammatically indicated in FIG. 5, with the end 120 of the inner shell being open and suitably affixed to the end 106 of the outer shell 102, so that the inner and outer shells 102 and 116 are fixed together in superimposed concentric relation. The inner and outer shells are proportioned to be received over the pedestal 82, which also receives helical compression spring 122 that in the practice of the invention is employed between the floor 69 of the bowl 68 and the annular flange 110 of the outer shell 102 to bias the assembly 100 against the lip or flange 56, which thus defines an annular bearing seat 124 for the seal 114.

In accordance with the invention, the outer shell 102 is formed from a foraminous material, of which the foramina thereof defines individual mesh openings that are of micro proportioning in size or effective area for effective straining or screening action; a further important aspect of the invention, however, is that the mesh openings defined by the outer shell, between the end flanges 108 and 110 thereof, have a total area that exceeds the area of the throat 58 by a factor that at least exceeds 10, and preferably that exceeds 13, and thus may be, for instance, 15. With this arrangement, even though the mesh opening total area defined by the outer shell 102 may be occluded over up to about 90 percent of same by foreign matter through normal operation of the device 100 and the CDC in which it is mounted, there would still be sufficient mesh opening area in the outer shell 102 to insure that there would be no significant reduction of air flow capacity of the CDC.

Further in accordance with the invention, the inner shell 116 may also be formed from the same foraminous material as outer shell 102. The inner shell 116 is further equipped at its end 118 with check valve assembly 130 to provide a stand-by path for air needed to charge or release the brakes in the event that the entire mesh surfacing of the strainer device 100 were to become so occluded that no air could otherwise pass through same.

SPECIFIC DESCRIPTION

Referring now to FIG. 5, in this Figure the device 100 is shown in its operative position within the CDC device. In this embodiment of the device 100, the inner and outer shells 102 and 116 are formed from stainless steel, as are the annular end flanges 108 and 110 of the outer shell 102, and are of elongate, frusto-conical configuration that roughly follows the conical configuration of pedestal 82. The individual mesh openings 140 of the outer and inner shells 102 and 116 are formed in any conventional manner, and have the indicated micro proportioning that preferably lies in the range of from about 20 mesh to about 400 mesh, with a mesh of 200 being preferred for this embodiment of the invention. The end flanges 108 and 110 are respectively suitably affixed to the outer shell 102, as by welding, as at 142 and 144, respectively, and, as indicated, they are ring shaped and thus open centered in configuration.

The seal 114 is formed in one piece configuration from a suitable soft rubber such as neoprene, or a suitable polyurethene of either the solid or foam type and is also ring shaped in configuration. The annular sealing surface 148 defined by the seal 112 is to be relatively soft since it is to be applied against the cast annular surfacing defined by seat 124. Annular flange 114 serves a centering or locating function for properly seating the device 100 against flange seat 124 in alignment with throat 58.

In the device 100 of FIGS. 2-6, the upper end 118 of the inner shell 116 is in the form of an imperforate disc like segment 150 that is formed with a plurality of small diameter perforations 152 of limited number (for instance, four to nine) that may be larger than the individual mesh openings 140, but are sufficiently small, preferably on the order of 1/16th of an inch in diameter, to have adequate emergency straining protection. Perforations 152 are normally closed by planar flapper member 154 that is preferably formed from a suitable elastomeric material and that is anchored to the inner shell top disc portion 150 by employing a suitable rivet 156. As indicated, the check valve assembly 130 provided at the inner shell end portion 118, namely segment 150, its apertures 152, and the flapper member 154, is normally closed as the result of the flapper member 154 lying flat against the inner shell end segment 150 due to the planar configuration of same and the resilient nature of the material from which it is formed as well as the affixing of same to the inner shell by rivet 156. However, as described hereinafter, if differential pressures exist across the check valve assembly 130 as the result of an attempt to charge or release the brakes with an approximate 100 percent occlusion of the strainer device 100 (both shells thereof), the check valve assembly 130 is to open to permit adequate air to pass to the control valve 12 insuring normal release and charging functions. The apertures or holes 152, which are preferably formed by a suitable piercing operation, are small enough to provide strainer protection, and since they remain closed when the strainer device 100 itself, and in particular the mesh openings defined by same, are open, the inner shell 116 will be free of contaminants in and around the apertures 152 whereby they will be open and permit free passage of air therethrough under the differential pressure conditions indicated.

Figure 10:
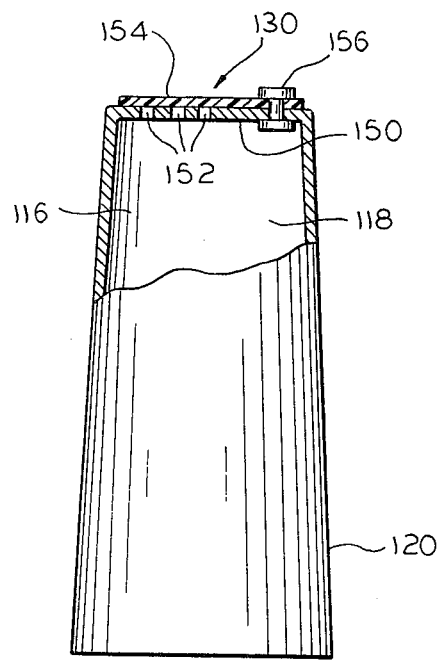
FIG. 10 shows the inner shell of the strainer device of FIG. 2 formed from an imperforate material.

Alternately, the inner shell 116 may be of imperforate construction, see FIG. 10, except for the apertures 152 that comprise part of the check valve assembly 130. A major purpose of the inner shell 116 is to prevent entrance of unstrained air coming or going through the lower end of the strainer device.

The inner and outer shells 102 and 116 are proportioned to accommodate the larger diameter pedestal 82 to be found in conventional CDC devices, whereby the device 100 is applicable to all such devices, some models of which have pedestals 82 of smaller diameter proportioning.

Figure 7:
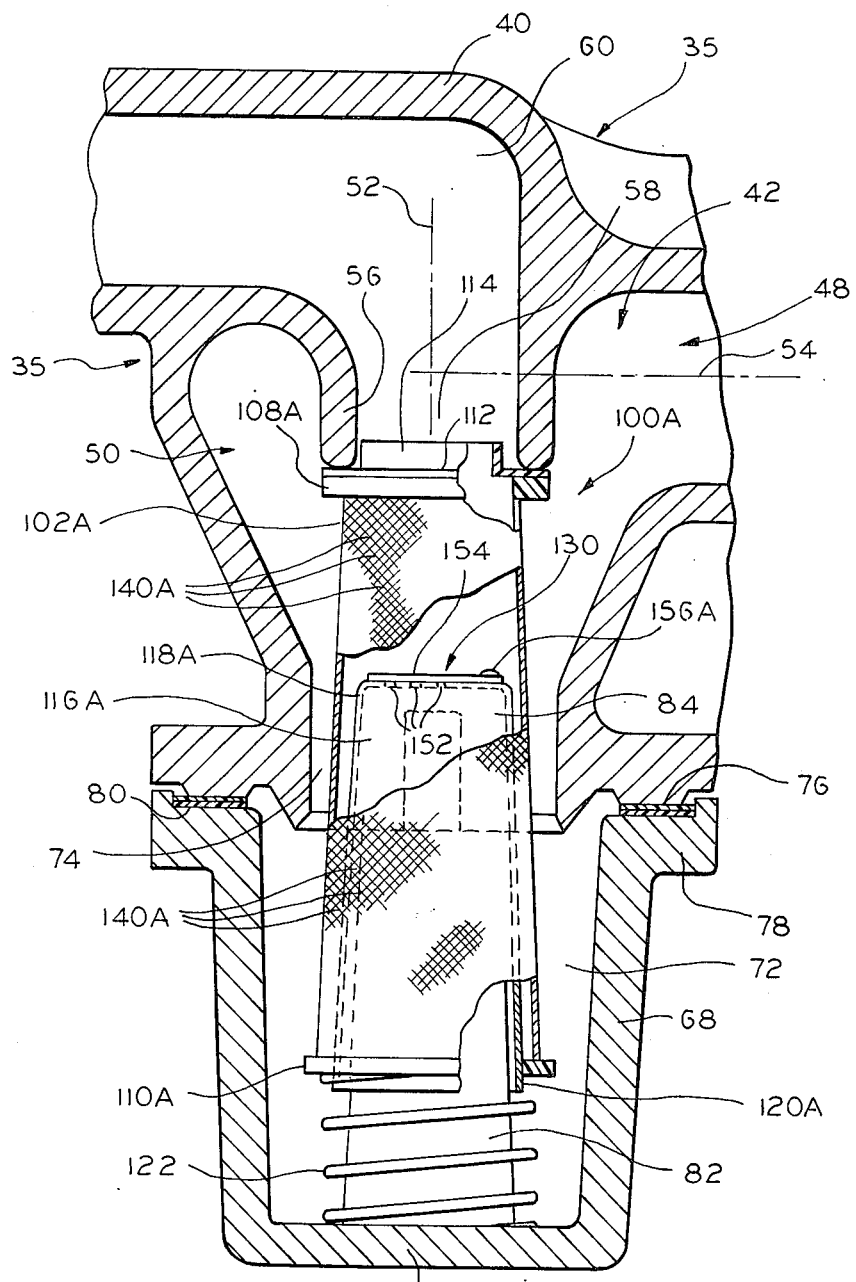
FIG. 7 is a view similar to that of FIG. 5, but illustrating an alternate form of strainer device applied to the CDC of FIGS. 1-5.

Referring now to the showing of FIG. 7, the CDC device 35 there illustrated is equipped with a modified strainer device 100A that is basically similar to the device 100 except that the inner and outer shells 102A and 116A are formed from nylon or some other suitable polymeric material, such as polyester or polyethylene, which material is to have such composition as to be fully operable in accordance with the objects of the inventions in the temperature range of from about minus 40 degrees F. to about plus 180 degrees F. Nylon is preferred for the inner and outer shells 102A and 116A, with the mesh openings of the shells having an opening size that preferably lies in the range of from about 850 microns to about 30 microns, with a mesh opening size of 75 microns being preferred for this embodiment of the invention. In the device 100A, the annular end flanges 108A and 110A are integrally formed as part of the outer shell 102A, with the seal 112 being a separate component as in the device 100.

Figure 11:
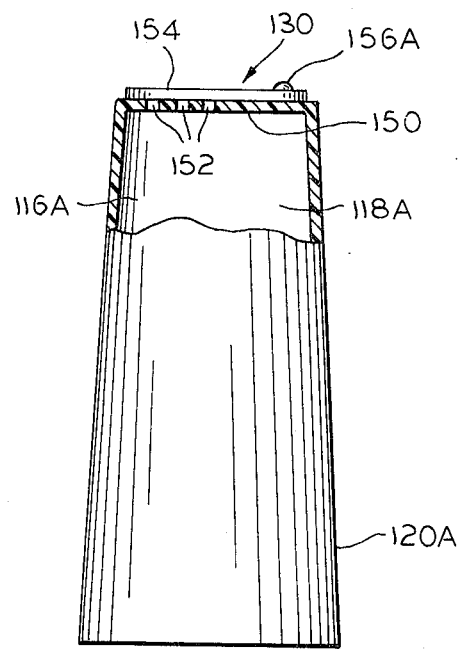
FIG. 11 shows the inner shell of the strainer device of FIG. 7 formed from an imperforate material.

The inner shell 116A has its end 120A suitably bonded to the end 106A of the outer shell 102A, as by employing a suitable bonding cement or the like. The check valve assembly 130 of the inner shell 116A is identical to the check valve assembly 130 of the device 100, except that the end portion 118A of same at which the apertures 152 are formed is an integral part of the inner shell 116A, and thus is formed from nylon or the like. The inner shell 116A alternately may be of imperforate form, see FIG. 11, except for the formation of the apertures 152 for use as part of the check valve assembly 130. In the shell 116A the flapper member 154 is anchored in place by ultrasonic welding or the like securement that is appropriate for plastics, where indicated at 156A.

In both the embodiments 100 and 100A of the strainer device, the inner and outer shells are formed from corrosion resistant materials, and are to have adequate columnar stiffness which might be provided in device 100A by suitable embedded braces in the plastic device 100A extending longitudinally of and in its shell 102A along the wall structure defined by same, to withstand the compressive force of compression spring 122 in biasing the outer shell 102 and its seal 112 against the seat 124, for firmly sealing the strainer devices against fluid flow through seat 124, between same and seal 112. However, the material from which the inner and outer shells are formed should be sufficiently resiliently flexible such that they flex somewhat when compressed axially thereof under normal operation of the air brakes, which has the benefit of shaking or breaking loose foreign materials that adhere to the mesh material forming a part of the device inner and outer shell, which foreign material will then drop into collector chamber 72. Thus, the devices 100 and 100A have a self cleaning action built into them which occurs during use, which thus helps avoid undesirable full occlusion of the mesh materials involved in the inner and outer shells.

Figure 8:
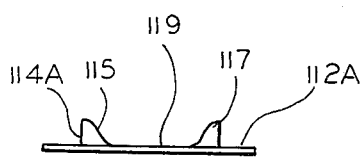
FIGS. 8 and 9 are a side elevational view and a top plan view illustrating a modified form of strainer centering seal for use with CDC's having a bar across the CDC throat.
Figure 9:
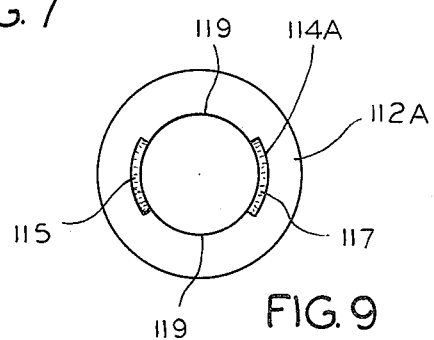

FIGS. 8 and 9 illustrate a modified seal 112A that may be substituted for seal 112 where the devices 100 or 100A are to be applied to CDC's of the type in which the CDC throat 58 has an integral bar extending diametrically across same at flange or lip 56, adjacent what becomes valve seat 124 in the practice of this invention. In seal 112A, the collar or flange 114A is in the form of a pair of diametrically opposed sub flanges 115 and 117 of limited circumferential proportions to provide the centering function of flange 114, and define opposed, relatively large flange recesses 119 for receiving the aforementioned cross bar (commonly found in a CDC device offerred by New York Air Brake Co).

OPERATION

The operation or functioning of the devices 100 and 100A is the same. The brake equipment 10 is charged in the usual manner, with the braking air under pressure being supplied to the brake pipe 14 by the usual locomotive brake valve 12 to operate the control valve 12 in the usual manner to effect charging of the reservoirs 16 and 18. As usual, when the brakes are in released relation, the brake cylinder pipe and the brake cylinder are closed off from the air pressure at the brake pipe 14 by the operation of the control valve 12 which thus is experiencing the air pressure of pipe 14 through CDC device 35.

During charging of the reservoirs 16 and 18, assuming that the isolation valve 86 of the car in question is in its normally open position, the air flow is from the brake pipe 14 into branch pipe 11 and thence into the CDC device 35, and thus into through passage 42, through valve chamber 46, axial passage chamber 48, and swirl chamber 50, at which the braking air reverses direction, under the nature of the swirl chamber 50 that is involved, with the braking air being diffused through the micro proportioned mesh openings defined by the outer shell 102 or 102A, and substantially along the length of same between its end flanges 108 and 110, and 108A and 110A. The air flow thence is through the end flanges 108, 108A and seal 112, by reason of their annular nature (see FIGS. 5 and 7) and into and through throat 58, throat chamber 60 and into the control valve 12 through passage outlet 62. When the brake equipment 10 is charged, with the brakes being in their released relation, the control valve 10 closes, which cuts off further air flow from the brake pipe 14 through the CDC device 35.

When it is desired to effect a service brake application, the brake valve in the train locomotive is actuated to reduce the fluid pressure in the brake pipe 14 an amount corresponding to the degree of brake application desired. This reduction of pressure in the brake pipe 14 effects a corresponding fluid pressure reduction in the branch pipe 11 and CDC device 35, which is also effective through the device 35 on the control valve 12, which thereupon operates in a conventional manner to connect the auxiliary reservoir 16 through pipe 24, valve device 27, and thence to brake cylinder and pipe 25 and brake cylinder 20. The valve device 27 may be of the empty and load type, such as that already referred or that disclosed in Scott U.S. Pat. No. 3,671,086, or it may be of the modulating type disclosed in Page and Rees, U.S. Pat. No. 4,179,165, with the operation of such valve assemblies being independent of the CDC device 35, except for the air flow through the latter. However, the reduction of the pressure in the brake pie 14 causes a reversal of the air flow through the device 35 and its strainer devices 100 or 100A, with the reverse air flow involved being smoothly even, as the air diffuses through the outer shell. This reversal air flow tends to make the device 100 and 100A self cleaning.

On release of the brakes, normal operating pressure in the brake pipe 14 is restored by operation of the usual brake valve of the locomotive, which results in the increasing air pressure in the brake pipe 14 being communicated to the control valve 12 through the CDC device 35, and the strainer devices 100 or 100A contained therein in the same manner as described with reference to initial charging of the brake equipment 10. The result is that the air under pressure from the brake pipe 14 is again communicated through the CDC device to control valve 12 which then operates to close off communication between the reservoir 16 and the piping 24 as well as valve device 27 and the brake cylinder 20.

The seal 112A acts in the same manner as seal 112, but in addition accommodates the aforementioned cross bar that may be in throat 56, which is freely received in recesses 119, the upper portions of sub flanges 115 and 117 being smoothly curved for good camming relation thereagainst when a device 100 or 100A having a seal 112A is applied to the CDC device 35 involved. In addition on reverse flow of air through the CDC device 35, as on a brake application, the recesses 119 pass air from throat 56 to chamber 50 as soon as seal 112A is separated from seat 124.

The manner of effecting emergency brake application is provided for in the usual manner, with control valve 12 operating through its emergency portion 26, on the emergency rate of reduction of air pressure in the brake pipe 14 being effected, to supply braking air under pressure from the emergency reservoir 18 to the brake cylinder. The air flow involved through the CDC device 35 and its strainer devices 100 and 100A is similar to that already described, but at corresponding flow rates.

The inner sleeves 116 and 116A have the purpose of preventing the entrance of unstrained air coming or going through the lower end of the strainer device, in either direction. The inner sleeves are designed to surround the pedestals 82 that heretofore have supported the conventional check valve of the conventionally arranged CDC devices (not shown but see the cited Car & Locomotive Cyclopedia authority at page 560). Check valve assembly 130 including its perforations 152 may be omitted from the sleeves 116 and 116A where they are to be foraminous in nature, as described.

The outer sleeve 102 is elongated in configuration and is made as large in that respect, and with regard to diameter, as reasonably practical in order to provide the mesh opening total area that will insure that all possible air restrictions at the strainer device are avoided, even in the event of severe coating with foreign material over the major portion of the surfacing of the outer shells. As illustrated in the drawings, the outer shell extends from adjacent the throat 58 to the lower third of the collection chamber 72, and is of frusto-conical configuration to take advantage of the wider dimensions of the collector chamber 72 diameter and thereby provide the needed additional mesh opening space along the length thereof.

Another important factor in the benefits provided by the invention is the micro proportioning of the mesh foramina of the device outer sleeves, and the inner sleeves where foramina is employed in the latter. It has been observed that most of foreign materials that the conventional CDC device is supposed to keep out of the control valve 12 are generally in the form of particulate matter of greatly varying size, but much of it is very small mesh size. As the foreign materials involved may be of organic or inorganic matter in composition, and may be in the form of dust, dirt, debris of various types, cinders, grit, metal particles, grains, and wood chips and even water that precipitates in the brake pipe, while the strainer device of this invention must be adapted to catch the larger particle sizes, the micro-proportioning of the mesh screening openings is an important factor in screening out or holding back from the control valve the smaller particulate matter encountered which can be as fine as will pass through screening of 80 to 150 mesh. One special characteristic of the present invention is that the micro-proportioning of the mesh screening openings is and the total mesh opening they provide are such that they can to a large degree be occluded by the foreign materials, including moisture, without adversely affecting proper air flow rates through the CDC equipped with the Applicants' invention, for both service and emergency braking action. The relatively large factor by which the total mesh opening area of the outer sleeve exceeds the area of the cock throat is a major consideration in this improvement.

In the event that full occlusion or substantially full occlusion of the strainer device 100 or 100A occurs after initial charging and after the usual terminal test of the brake equipment, any significant differential pressures occuring across the strainer devices 100 and 100A, as a result of brake pipe reduction for brake application purposes, will result in the pressure in throat 58 exceeding that in passage portion 48, which causes the pressures on seal 112 to deflect the device 100 or 100A downwardly against the biasing action of the spring 122, thereby creating an opening at seat 124 whereby the appropriate air flow may take place to permit full application of the brakes. This also effects a significant self cleaning action on the strainer by reason of its resilient flexibility laterally of same.

In addition, the check valve assembly 130 remains available for operation in the event that the entire surfacing of the outer sleeve becomes so coated or occluded that no air can pass through it. Under such circumstances, on charging or releasing of the brakes, the higher pressure within the swirl chamber 50 and collection chamber 72 forces air between the inner shell and the pedestal 82, which is effective to open the check valve assembly 130 by upwardly biasing flapper member 154 so that such air can pass to throat 58 through apertures 152 and the bores defined by end flange 108 and seal 112, whereby normal brake charging and release functions are assurred.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

What is claimed is:

1. A combined dirt collector and cut out cock device for railroad cars adapted for incorporation in the car brake cylinder air supply system in the car branch pipe extending between the car brake pipe and the car air brake control valve, said cock device comprising:
   a fitting body having a through passage formed therein including a valve chamber adjacent the brake pipe end of same,
   off-on valve means operably mounted in said valve chamber for selectively closing and opening said passage,
   said passage including a swirl chamber centered about and coaxial with an annular flange defining a throat communicating with the control valve end of said cock device,
   said cock device including a foreign matter collection chamber below and aligned with said passage swirl chamber and defined by a bowl removably mounted on said body and defining an upstanding pedestal centered within same and coaxially aligned with said swirl chamber and said throat along an axis extending longitudinally and centrally of said pedestal,
   a strainer device mounted in said cock device,
   said strainer device comprising:
   an inner shell received over said pedestal, with one end of said inner shell being disposed above said pedestal and the other end of said inner shell being disposed about said pedestal,
   an outer shell received over said inner shell with one end of said outer shell projecting toward and substantially centered on said fitting body flange, and the other end of said outer shell being substantially centered on said inner shell and disposed adjacent to said other end of said inner shell,
   an annular seal interposed between said outer shell one end and said flange,
   and means for resiliently biasing said outer shell toward said flange to sealingly seat said seal against said flange,
   said outer shell being open at said one end of same and being formed from a corrosion resistant foraminous material defining a multitude of mesh openings thereabout that are of micro-proportioning,
   said mesh openings in total area exceeding the area of said throat by a factor of at least ten,
   with said inner shell being fixed to said outer shell and being formed to pass only strained air therethrough.

2. The cock device set forth in claim 1 wherein:
   said corrosion resistant material comprises stainless steel,
   and said mesh openings define foramina having a mesh lying in the range of from about 20 mesh to about 400 mesh.

3. The cock device set forth in claim 1 wherein:
   said corrosion resistant material is a polymer,
   and said mesh openings define foramina having a mesh lying in the range of from about 850 microns to about 30 microns.

4. The cock device set forth in claim 1 wherein:
   said inner shell is formed from said corrosion resistant material.

5. The cock device set forth in claim 4 wherein:
   said corrosion resistant material forming said inner shell is formed from an imperforate material.

6. The cock device set forth in claim 8 wherein:
   said corrosion resistant material forming said inner shell is formed from a foraminous material.

7. The cock device set forth in claim 1 wherein:
   said corrosion resistant material is resiliently flexible for purposes of self cleaning of said mesh openings under longitudinal stresses applied to said outer shell during operation of the air supply system.

8. The cock device set forth in claim 1 wherein:
   said resilient biasing means comprises a helical compression spring applied about said pedestal and seated against said other end of said outer shell.

9. The cock device set forth in claim 1 wherein:
   said inner shell has said other end of same fixed to said outer shell adjacent said other end of said outer shell to fix said inner shell to said outer shell,
   with said one end of said inner shell overlying said pedestal and extending short of said throat.

10. The cock device set forth in claim 9 wherein:
    said inner shell one end includes a plurality of spaced apart apertures,
    and including flapper valve means overlying said inner shell apertures for normally sealing same and effecting opening of same on full occlusion of said outer shell and the air pressure at said throat being less than that within said inner shell.

* * * * *